United States Patent [19]

Nolan

[11] Patent Number: 4,550,843
[45] Date of Patent: Nov. 5, 1985

[54] BOTTLE CAPS
[75] Inventor: Robert L. Nolan, New York, N.Y.
[73] Assignee: Maxcap, Inc., New York, N.Y.
[21] Appl. No.: 449,783
[22] Filed: Dec. 14, 1982
[51] Int. Cl.⁴ .............................................. B65D 41/34
[52] U.S. Cl. .................................... 215/252; 215/321
[58] Field of Search ................ 220/260, 288; 215/252, 215/321, 253, 258, 256

[56] References Cited
U.S. PATENT DOCUMENTS

| 4,291,813 | 9/1981 | Allen et al. | 215/252 |
| 4,299,328 | 11/1981 | Ochs et al. | 215/252 |
| 4,301,937 | 11/1981 | Von Hagel | 215/252 |
| 4,305,516 | 12/1981 | Pernz et al. | 215/252 |
| 4,394,918 | 7/1983 | Grussen | 215/243 |
| 4,401,227 | 8/1983 | Pehr | 215/252 |
| 4,402,418 | 9/1983 | Ostrowsky | 215/252 |

Primary Examiner—Joseph Man-Fu Moy
Attorney, Agent, or Firm—Abner Sheffer

[57] ABSTRACT

A plastic screw cap for carbonated beverage bottles having standard necks. Screwing the cap on forces its antitamper skirt over a shoulder of the bottle neck. Unscrewing the cap causes the skirt, or a portion connecting the skirt to the main body of the cap, to break. The skirt has a throat whose I.D. (inside diameter) is smaller than the O.D. (outside diameter) of the bottle threads, but is large enough so that the cap can, under light pressure, wobble or rock down the neck to seat the cap properly for screwing on. The skirt may have a flap which becomes effective to decrease the effective skirt diameter when the cap is being unscrewed.

17 Claims, 32 Drawing Figures

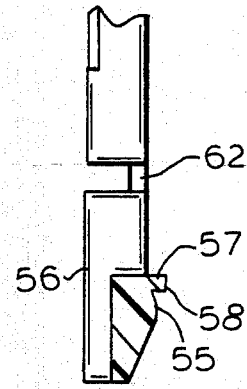
FIG.20
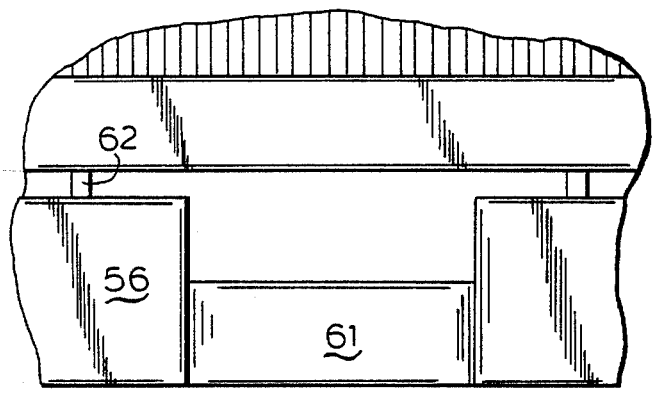
FIG.19
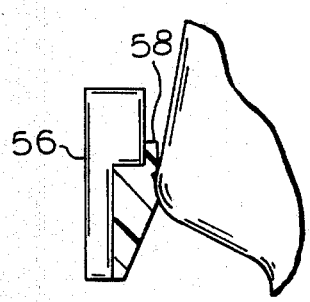
FIG.21
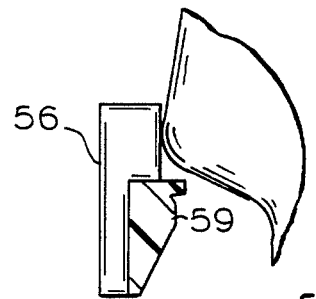
FIG.22
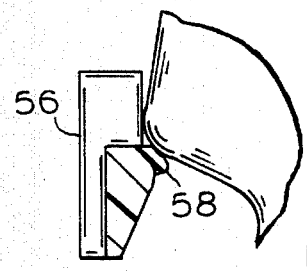
FIG.23
SCALE

4,550,843

BOTTLE CAPS

This invention relates to plastic screw caps for bottles. Some embodiments are illustrated in the accompanying drawings in which FIG. 1 is a side view showing a cap (in cross-section) being engaged by the neck of a bottle when the bottle is moved past a cap-supplying chute and under a cap-seating plate.

FIGS. 2, 2A, 2B and 2C are side views showing successive positions of the cap skirt (in cross-section) as it wobbles down the neck to a position in which the cap is ready to be screwed on.

FIGS. 19–24 show portions of another embodiment in which the skirt has a flop.

FIG. 19 is a cross-sectional side view.

FIG. 20 is a side view with parts broken away.

FIGS. 21 to 23 are like FIG. 19, but show successive interactions of the skirt flap and bottle shoulder.

FIG. 24 is a top view of the skirt.

Figure 1:
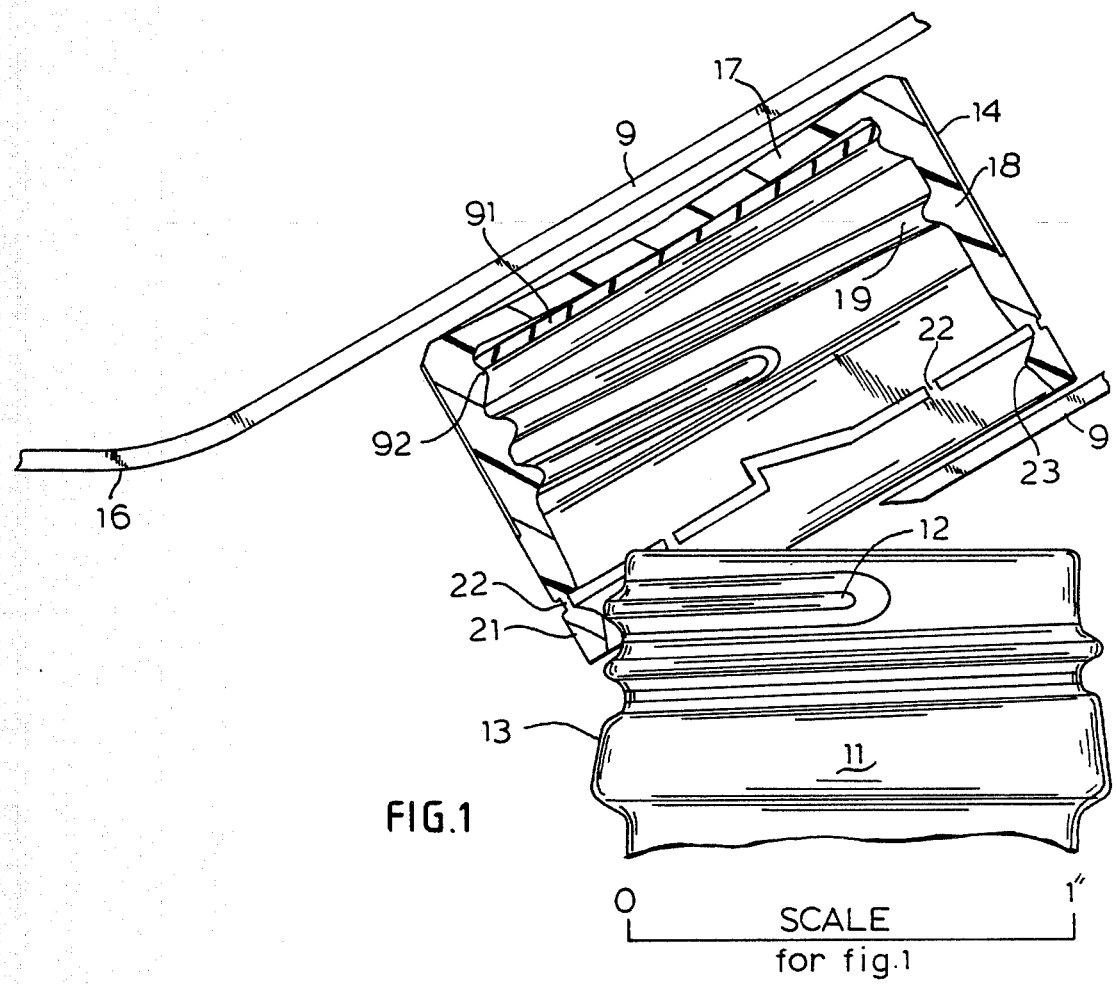

The drawings are to scale, as indicated.

The illustrated embodiments relate particularly to a plastic cap for use on the standard necks of carbonated beverage bottles. The cap is preferably made by injection molding, using conventional techniques (e.g., in a cam mold), and typically is made of a polyolefin, such as stero-regular polypropylene. One suitable material is a propylene copolymer such as Soltex Fortilene 5220 having the following typical properties: density 0.918 g/cc; melt flow index (ASTM D1238) 4.0 g/10 min; tensile strength, yield (ASTM D638) 29 MPa (=4250 psi); tensile strength, break (ASTM D638) 20 MPa elongation, yield (ASTM D638) 10%; elongation, break (ASTM D638) 270% flexural modulus (ASTM D790) 1069 MPa; secant modulus of elasticity (ASTM D638) 1600 MPa; notched Izod impact at 23° C. 48 J/M; unnotched izod impact at 23° C. more than 1335 J/M; deflection temperature at 66 psi 115° C.; hardness 69 Shore D. The bottles may be made of glass or plastic, as is conventional in the art of bottling carbonated beverages.

When the bottle is made of plastic the standard neck 11 (shown in FIG. 1) has an external screw thread 12 whose pitch is 8 turns per inch, below which is a shoulder 13 formed as a continuation of that thread. In the standard specifications (Aluminum Company of America published specifications for neck finish 1716 for aluminum screw cap; e.g. Aluminum Company of America drawing No. C969-1716-001) the thread O.D. is 1.085±0.005 inch and the shoulder O.D. is 1.101±0.005.* Thus the thread O.D. may be as high as 1.090 and shoulder O.D. may be as low as 1.096. The root diameter of the threaded portion is 0.982±0.005; the O.D. of the neck just below the shoulder is almost the same, i.e. about 0.965. There are about 1½ turns of thread; specifically the full thread extends over 509°45' and a fadeout portion extends another 141°8'.

*all linear dimensions are in inches unless otherwise specified.

The standard neck for a glass bottle is generally similar in construction although the specific thread pitch and placement, etc., are different. The specifications (Glass Packaging Institute spec. no. 1650 for 28 mm. thread finish for aluminum screwcap; e.g. G.P.I. DWG. No. 16502) call for a thread O.D. of 1.083+0.013, −0.012 and a shoulder O.D. 1.100+0.013, −0.012. Thus the thread O.D. may be as high as 1.096 and the shoulder O.D. may be as low as 1.088. The root diameter of the threaded portion has a diameter about 0.105 less than the thread O.D. The O.D. of the neck just below the shoulder differs from the shoulder O.D. by at least 0.090. The full thread extends over at least 390°; beyond the full thread portion the thread runs into the shoulder portion of the neck.

The cap is intended for use with high speed conventional capping machinery. In such machinery the caps are fed successively (e.g., through a chute, 9) at the base of which each cap is suspended (being held resiliently by spring fingers, for instance) in the path of the moving series of bottles on a conveyor (not shown) so that each cap is picked up by the neck 11 of a bottle passing under the chute. FIG. 1 shows the positions of suspended cap 14 and bottle neck 11 at the pick-up point. Then the conveyor moves the bottle under a plate 16 which engages the cap to seat it properly on the neck. The bottle next moves under a capping head (not shown) which grips the main body of the cap (but not the skirt) and rotates it to screw it tight onto the bottle neck. In a conventional capping line, operating at 100–450 caps per minute or more, the time available for the cap to become properly seated (i.e. the travel time between the point where the cap is picked up and the point where it is engaged by the capping head) is less than 1 second.

The cap shown in FIG. 1 comprises a top wall 17 and generally cylindrical side wall 18 which has an internal integral screw thread 19 for engaging the thread 12 of the bottle neck and has, at the bottom, an integral antitamper skirt 21 which is connected to the side wall 18 by spaced connectors 22. The thread I.D. (at the apices of the threads) is typically about 1.01. The I.D. between and below the thread is typically about 1.11.

The internal diameter (I.D.) of the skirt at its narrowest portion or throat, 23 is significantly smaller than the neck thread O.D. and the neck shoulder O.D., but greater than (preferably at least about 0.08 greater than) the root diameter of the threaded portion of the neck (and similarly greater than the neck O.D. just below the shoulder). For example, the I.D. of the skirt at its narrowest portion is preferably less than 1.080 (e.g., 1.065 to 1.075). Despite this, it is found that when the cap is picked up by the moving bottle neck, and before the screwing-on operation begins, the cap seats readily, quickly and accurately onto the bottle neck when the top of the cap passes under the plate 16 and is pressed downward by its engagement with that plate; the downward pressure, for such seating, may be relatively light, such as about one pound, The progress of the cap down the neck to a position where it is ready to be screwed onto the neck involves a wobbling or rocking motion with a slight tilt which may move orbitally around the cap. FIGS. 2, 2A, 2B and 2C show successive positions of the skirt 21 as it wobbles down to seat itself on the neck. If, at this stage, (when the mating threads are still not yet operatively engaged with each other) the bottle (empty of course) is inverted, the cap will tend to remain on the neck for a noticeable time and then (possibly due to vibratory movements transmitted thereto) may fall off.

In one preferred form the I.D. at the throat 23 is about 0.055 to 0.065 greater than the I.D. of the thread 19 of the cap.

When the cap is screwed onto the bottle neck, the downward helical movement of the cap forces the skirt 21 over the shoulder 13 and, finally, to a position in which the throat 23 of the skirt is underneath the shoulder 13. In this movement the screwing-on-force exerted on the main body of the cap (by the conventional capping head) is transmitted to the skirt through the frangible connectors 22.

Figure 4:
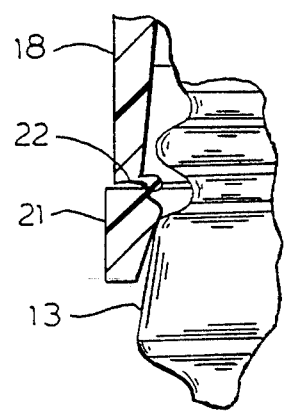
Figure 5:
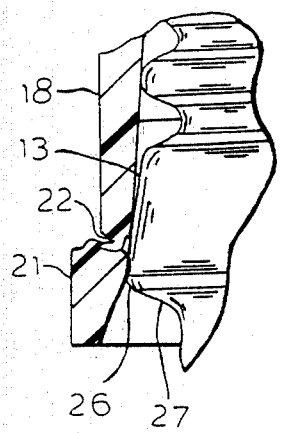
Figure 6:
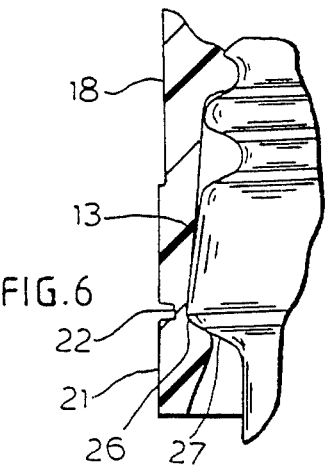

When the cap is being screwed on and the skirt 21 first engages, and is retarded by, the shoulder 13 the distance between skirt and the side wall 18 decreases (See FIG. 4) and the connectors become bent or folded as indicated in FIG. 4. When the throat 23 of the skirt is forced onto the shoulder the skirt is stretched (FIG. 5) elastically. Then, when the throat of the skirt passes the widest portion 26 of the shoulder the skirt moves inward elastically along the sloping lower face 27 of the shoulder and thus moves axially downward, away from the side wall 18, to the extent permitted by the connectors 22 (FIG. 6). The connectors are dimensioned so as to withstand this downward force on the skirt without breaking. When the cap is unscrewed, the engagement between the skirt and the shoulder 13 causes the skirt to lag behind the main body of the cap so that the connectors break. Thus the skirt remains on the bottle neck.

In a preferred embodiment there is an additional one-way connection between the side wall and the skirt which positively transmits the screwing on force from the side wall to the skirt thus relieving the forces on the connectors 22. This makes it possible to use much thinner connectors which break more easily on initial unscrewing of the cap; in fact the connectors may be so thin that, in the absence of the one-way connection, they would break when the skirt is being forced over the shoulder. In this particular embodiment shown in FIGS. 1 and 7 this is accomplished by an integral upwardly projecting tooth 29 on the skirt and a corresponding recess 31 in the bottom of the side wall 18. When the cap is being screwed on (and the skirt 21 first engages, and is retarded by, the shoulder 13 and moves closer to the main body of the cap) the forwardly moving edge 32 of the recess 31 engages the rear face of the tooth and positively transmits the rotation of the main body of the cap to the skirt.

Figure 7:
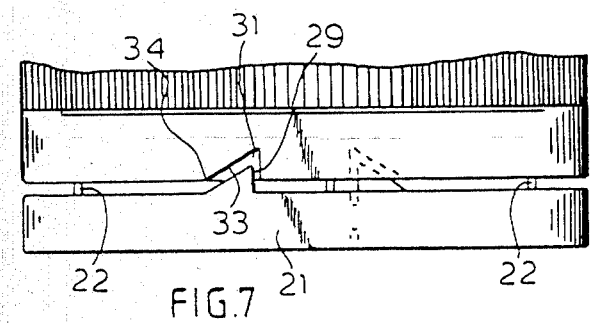
FIG. 7 is a side view of the lower portion of the cap of FIG. 1 showing a one-way driving connection between the cap sidewall and skirt.
Figure 8:
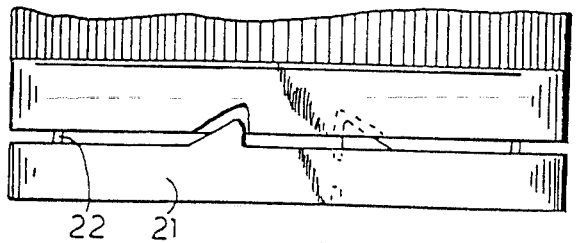
FIG. 8 is like FIG. 7, but showing a modified form of connection.

As illustrated in FIG. 7 there are preferably a plurality of teeth 29 and recesses 31 spaced around the circumference of the cap; e.g. a pair spaced at 180° as shown. The points of the teeth and edges of the recesses need not be sharp but can be rounded as shown in FIG. 8.

A preferred embodiment includes means for positively insuring that the skirt lags behind the main body of the cap, when the cap is first unscrewed by the user, so that the breaking of a connector 22 will occur on initial rotation in the unscrewing direction. For instance, as illustrated in FIGS. 1, 7 and 8 the recess 31 is so shaped that its trailing edge 33 (and particularly its corner 34) are engaged by the tooth 29 during such rotation. The height of the tooth is sufficiently greater than the length of the breakable connector 22 so that such rotation forces the skirt downward relative to the main body of the cap to an extent sufficient to break that connector, preferably within the first 180° of such rotation.

Figure 9:
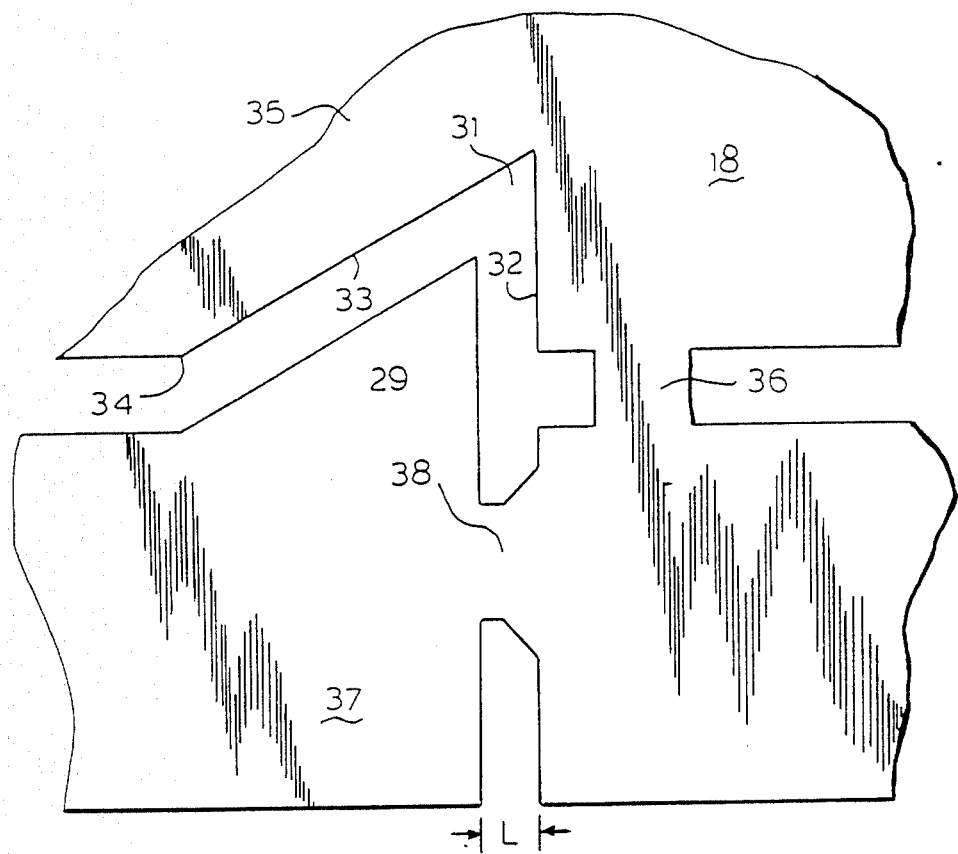
FIG. 9 is a side view of portions of the sidewall and skirt of another embodiment.
Figure 10:
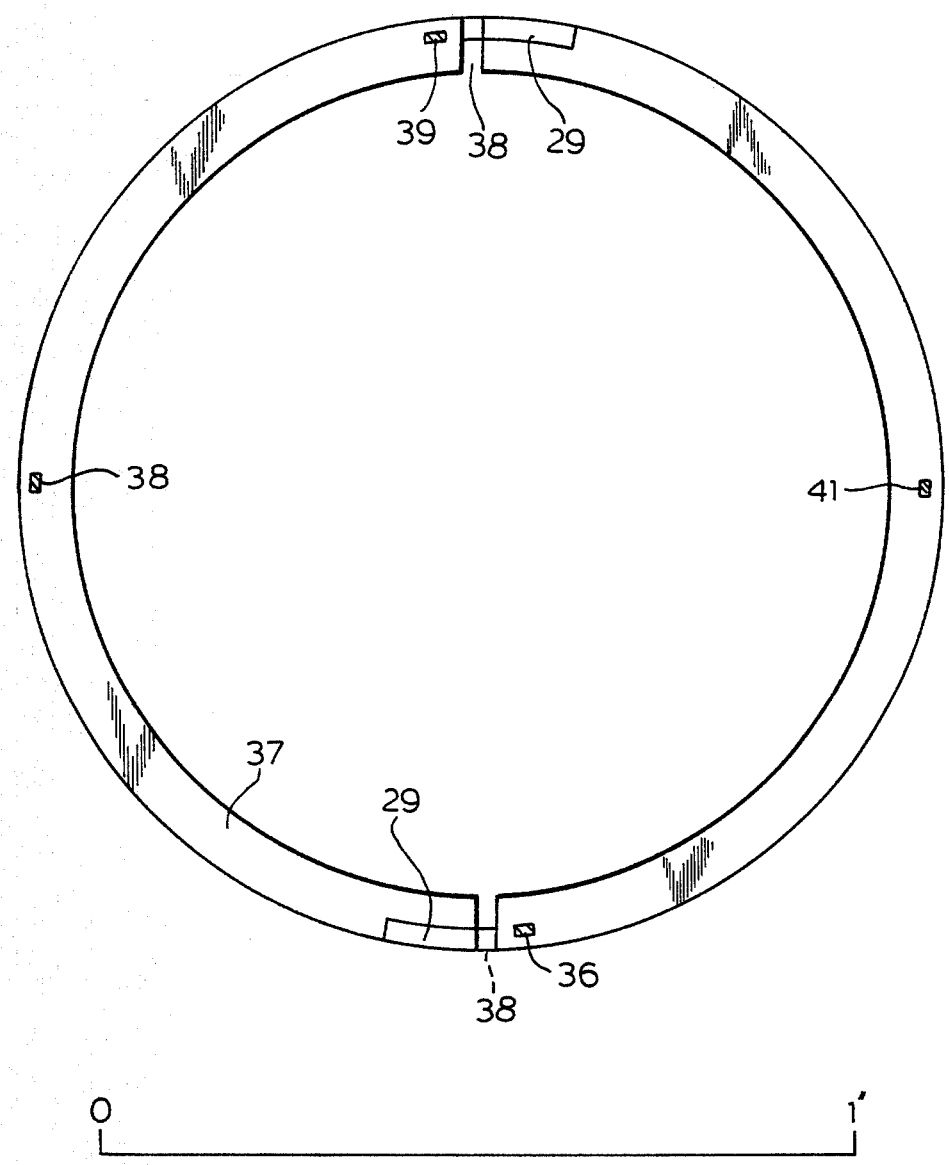
FIG. 10 is a top view of the skirt of FIG. 9, showing the connectors in cross-section.
Figure 11:
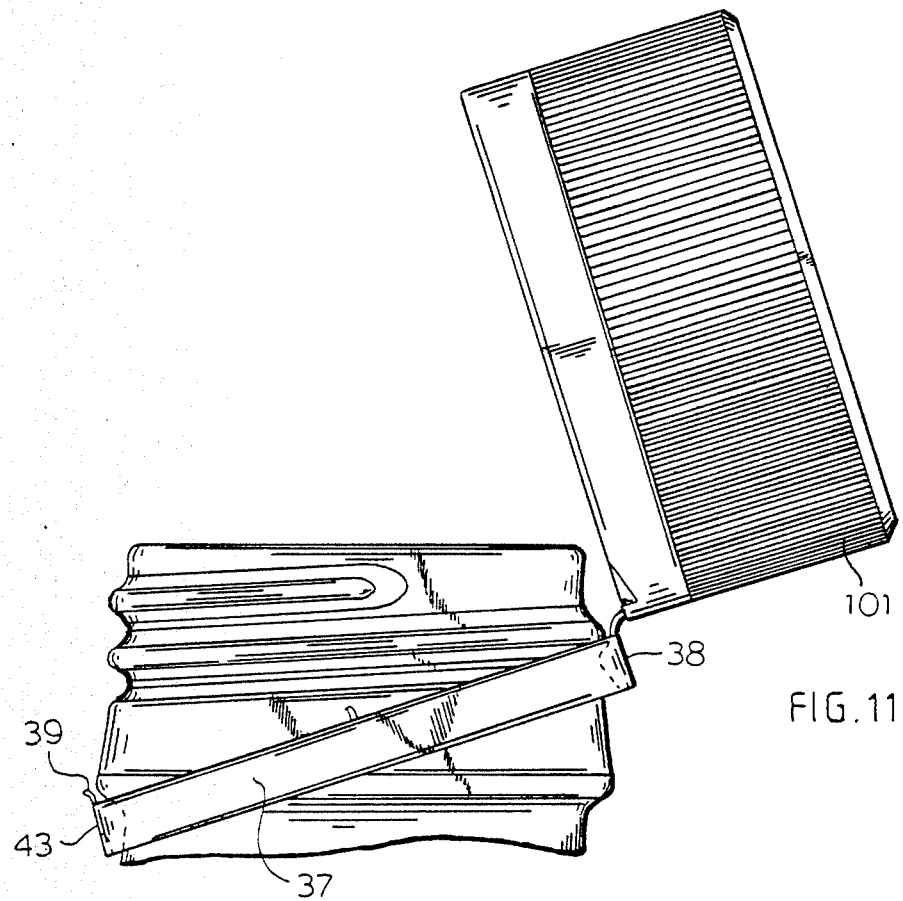
FIG. 11 is a side view of the embodiment of FIG. 9 after the cap has been unscrewed.

In the embodiment illustrated in FIG. 9 the skirt remains attached to the bottle cap 35 when the latter is unscrewed. To that end there is at least one relatively strong connector 36 joining the skirt 37 to the cap side wall 18, and the skirt preferably has at least one relatively weak zone 38 which is weak enough to be broken easily by the user without breaking said strong connector 36. There are also one or more spaced weaker connectors 38, 39, 41 (FIG. 10) joining the skirt to the main body of the cap. The upward movement of the cap during unscrewing causes a weaker connector 39 (situated opposite to the stronger one 36) to break, thus indicating the tampering. The upward movement of the cap also exerts an upward pull on the part of the skirt adjacent to the strong connector 36 causing that part of the skirt to ride up over the neck shoulder 13 so that at the end of the unscrewing operation (when the cap threads are substantially completely disengaged from the bottle threads) the skirt is cocked on the bottle neck, as illustrated in FIG. 11. In reaching this cocked position the then-lower portion 43 of the skirt moves downward and inward somewhat, under the shoulder 13. The skirt can then be left on the bottle neck. In that case, the cap can be screwed on or off the neck when desired but remains with the bottle, being hinged to the skirt by the strong connector. The user can also, by a sharp tug on the cap, cause the weak skirt zone 38 to break, so that the cap, carrying the broken skirt, will be entirely free of the open bottle.

In testing one suitable construction, in which the skirt had two weak zones 38, spaced about 180° apart, as illustrated (FIG. 10), the circumferential length ("L" in FIG. 9) of each zone 38 being about 0.02 inch as molded, it was found that when the narrowest portion (throat) of the skirt was forced onto the shoulder 13 of the bottle one zone 38 was stretched to a circumferential length of about 0.04 inch and the other zone was stretched to a circumferential length of about 0.027 inch. When the cap was screwed on further, so that the skirt moved inward elastically (as previously described) the zones 38 contracted to return to substantially their original lengths or very slightly larger (e.g. 0.025 inch each).

Figure 12:
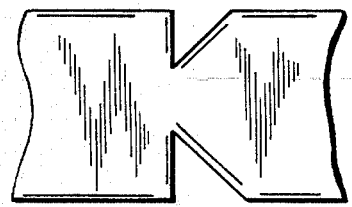
FIGS. 12 and 13 are side views of two forms of weak portions of the skirt.

One configuration of a weak zone 38 is illustrated in FIG. 9 in which that zone is tapered. The stress of stretching over the shoulder is greatest at the narrowest portion, or waist 44 of that zone and the circumferential length of the waist is short, so that the degree of stretching there may be great enough to cause a permanent lengthening which is evident from a whitening or "blushing" of the plastic at that waist particularly in the less preferred version shown in FIG. 12.

Figure 13:
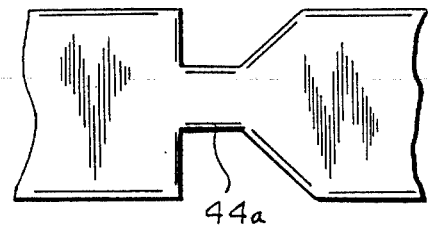

Another suitable example of a weak zone is illustrated in FIG. 13 in which the as-molded waist 44a is somewhat longer than in FIG. 9.

It is to be understood that the choice of the best dimensions for the weak zone will depend on such factors as the particular plastic used to make the cap, the molding conditions, the temperature at which the capping operation takes place, etc.

The weaker connectors such as 38, 39, 41 serve not only as tamper indicators. They also serve to keep the skirt substantially in a position concentric with, and close to, the main body of the cap, which helps to avoid difficulties when conventional capping systems are used in which the caps are first fed to a conventional orienting device so as to align them properly before they enter the cap-feeding chute (previously discussed). In one common form of orienter the caps are tumbled against each other and against spaced barriers (such as rotating disks) so that only properly aligned caps pass the barriers.

Instead of spaced frangible connectors, the skirt and the main body of the cap may be joined by other frangible means such as a thin integrally molded membrane of plastic.

Figure 14:
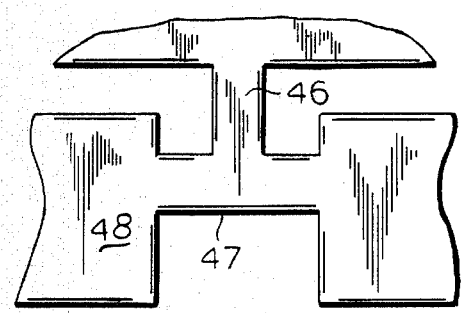
FIG. 14 is a side view of a portion of another embodiment showing a connector and a weak skirt zone.
Figure 14A:
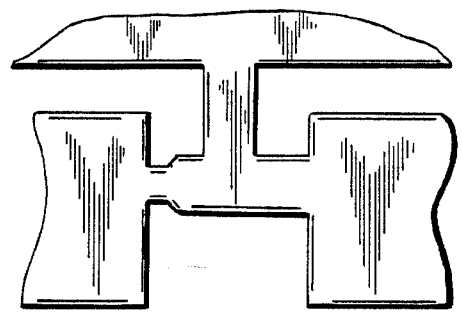
FIG. 14A shows a modification of the structure shown in FIG. 14.
Figure 17:
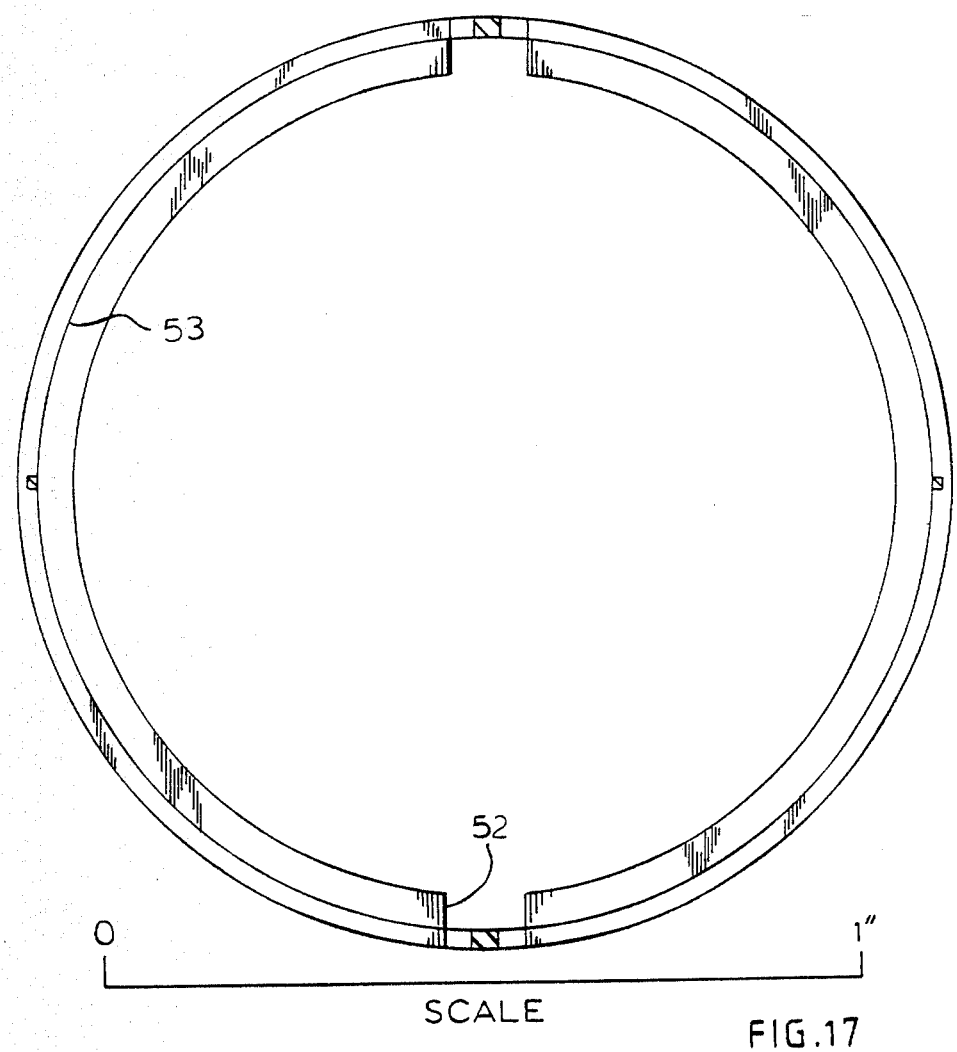
FIG. 17 is a side view of portions of the skirt and shoulder, showing one preferred skirt contour for restraining inward movement of the skirt.
Figure 15:
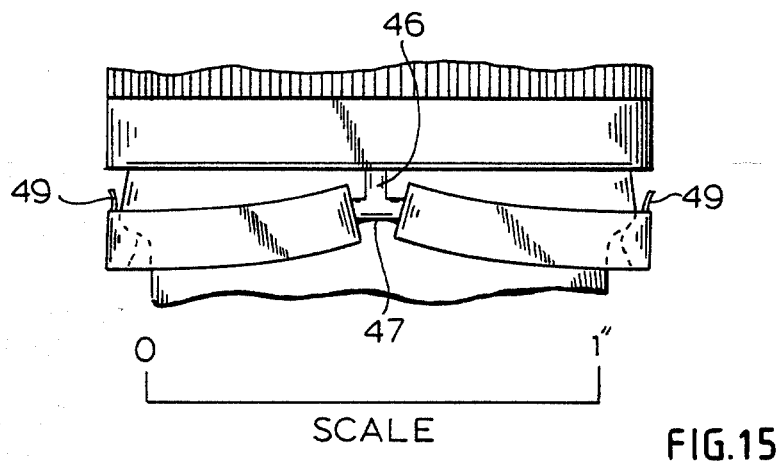
FIG. 15 is a top view of the skirt, showing the connectors in cross-section, of the embodiment of FIG. 14.
Figure 16:
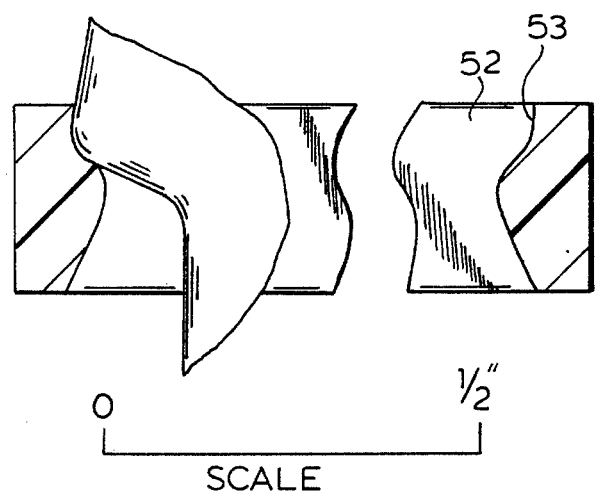
FIG. 16 is a side view of an embodiment as in FIG. 14 showing a portion of the cap, on the neck, at a stage when the cap has been partly unscrewed.
Figure 18:
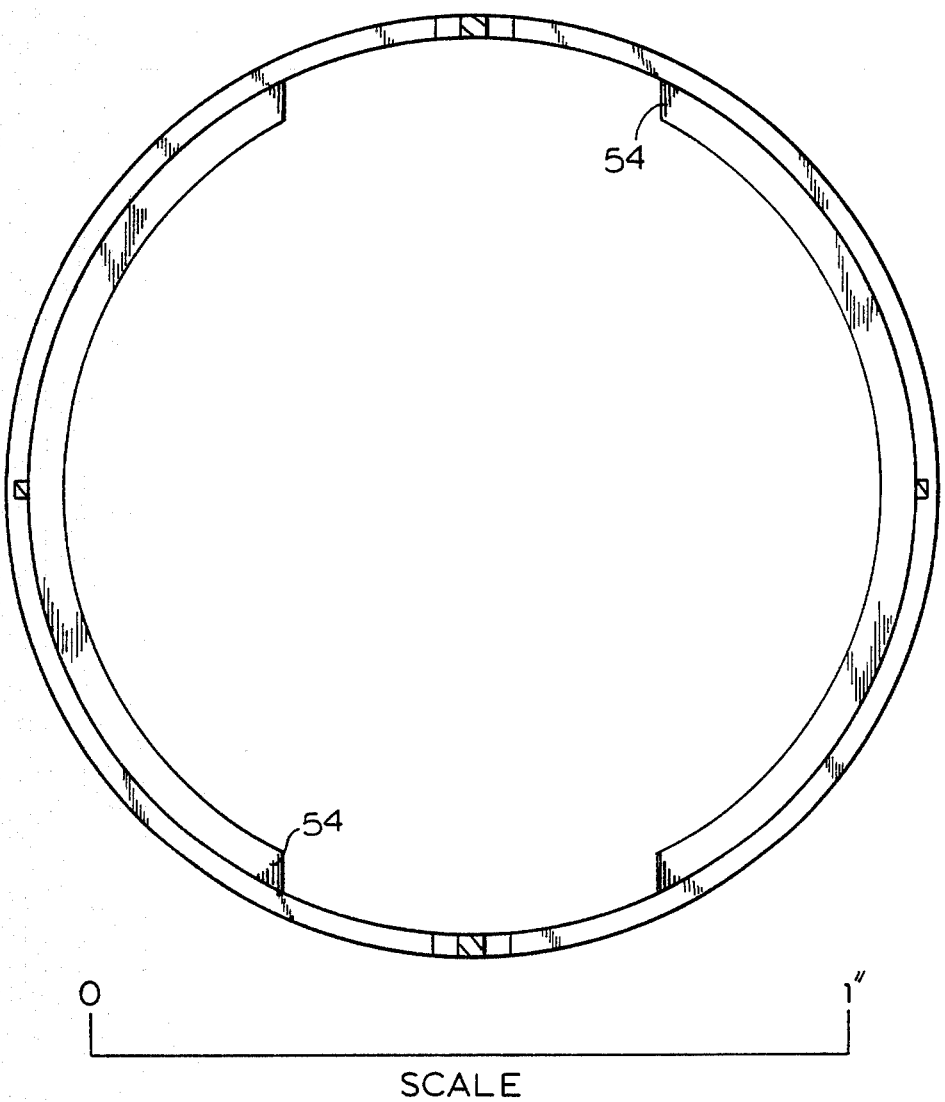
FIG. 18 is a top view of a skirt, with connectors in cross section, in which the extent of said skirt contour is limited.

In another embodiment, shown in FIG. 14, the relationship between the strong connector 46 and the weak skirt zone 47 is such that the tension in that strong connector, resulting from unscrewing the cap is transmitted directly to that weak skirt zone. This tension can first cause the part of the skirt 48 near the strong connector to ride over the shoulder and then cause the weak zone 47 to break; the broken skirt comes off the bottle with the cap. FIG. 14A shows a modified version of FIG. 14. FIGS. 15 and 16 illustrates the action with a skirt having a pair of diametrically opposed weak zones 47 respectively connected to a pair of strong connectors 46, while, spaced between the strong connectors, are a pair of thin frangible connectors 49 (FIG. 15) which break during the initial stages of unscrewing of the cap. The cross-section of the skirt is such that when a skirt portion 48 close to a strong link is pulled upward over the shoulder 13 the other portion(s) remain(s) under the shoulder. To this end the skirt is shaped to prevent inward movement thereof. (Such inward movement would permit outward movement of the other portion of the skirt and thereby allow that other portion to ride up over the shoulder, bringing the skirt to a cocked position similar to that shown in FIG. 11; in that position the threads of the cap have moved out of engagement with the bottle threads and the unscrewing force is not available for breaking a weak zone of the skirt.) In the embodiment illustrated in FIGS. 16 and 17 the skirt above its narrowest portion has a pocket 52 contoured to fit against the shoulder, with outer wall 53 of the pocket restraining such inward movement. The pocket 52 may extend substantially all the way around the skirt (as in FIG. 15) or the corresponding pocket 54 may extend for only limited portions of the skirt as illustrated in FIG. 18.

In another embodiment, illustrated in FIGS. 19-25 the throat 55 of the skirt is enlarged somewhat so that it can ride down over the ring with less, or no resistance (e.g. its diameter is only about 0.015 inch smaller than the diameter of the widest part of the shoulder 13 rather than say about 0.030 inch smaller than that shoulder diameter as preferred in the other illustrated embodiments). The skirt 56 has integrally hinged thereto an inwardly extending flap 57. When the cap is being screwed on, the outer end 58 of the flap engages, and is pushed outwardly (and upwardly) by the shoulder 13 (FIG. 21) and then moves back inwardly underneath the shoulder as shown in FIG. 22. When the cap is unscrewed and the skirt starts to move upward, the flap is pressed against the shoulder and moved to the position shown in FIG. 23 in which the combined thickness of the flap 57 and of the inward bulge 59 at the throat of the skirt is such that the effective internal diameter of the skirt is decreased, making it impossible for the skirt to move upward further without breaking a weak zone of the skirt. In one preferred form the weak zone 61 is at that portion of the skirt which carries the flap; see FIG. 24.

It is understood that the skirt may have more than one flap and weak zone, e.g. 2 or more, preferably spaced equally around its circumference as illustrated. Instead of a relatively wide flap as illustrated there may be, for instance, a plurality of spaced narrow flaps. It should also be understood that the flap-carrying skirt may be connected to the main body of the cap by any of the previously illustrated arrangements, such as by frangible connectors (without a strong connector); or by the combination of frangible connectors and strong connector shown in FIG. 9, for instance, with or without a weak skirt zone; or by the combination of connectors and weak zones shown in FIG. 14, for instance.

In the embodiment illustrated in FIGS. 19-24 the skirt may be formed with a circumferential outer wall and corresponding pocket to stabilize the movement of the skirt with respect to the shoulder, as described earlier.

Figure 24:
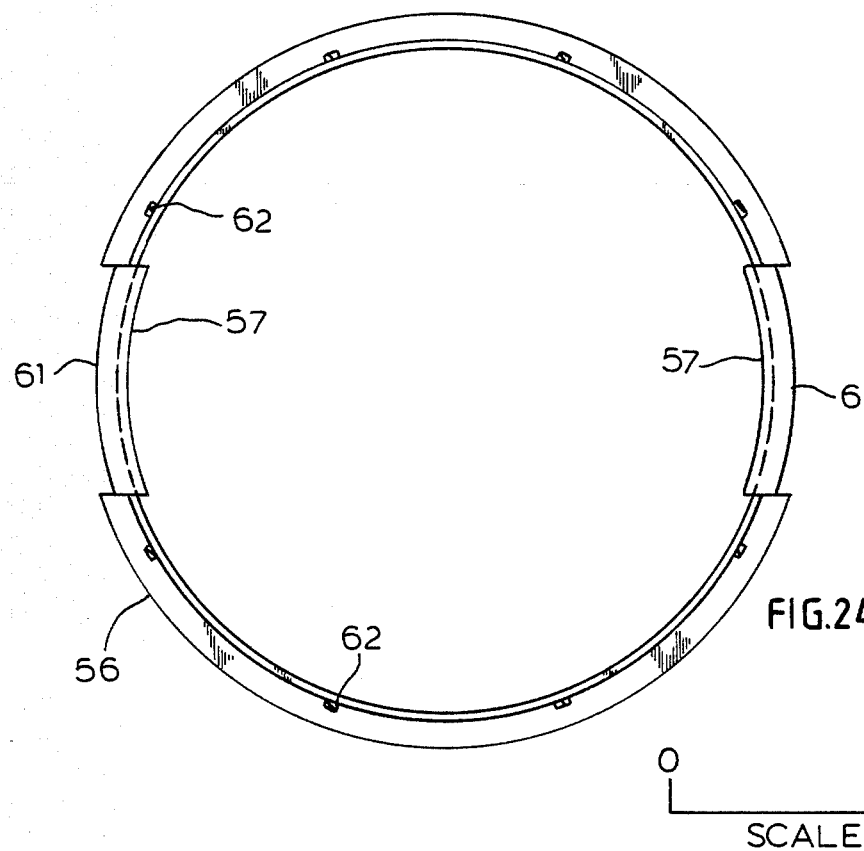
Figure 25:
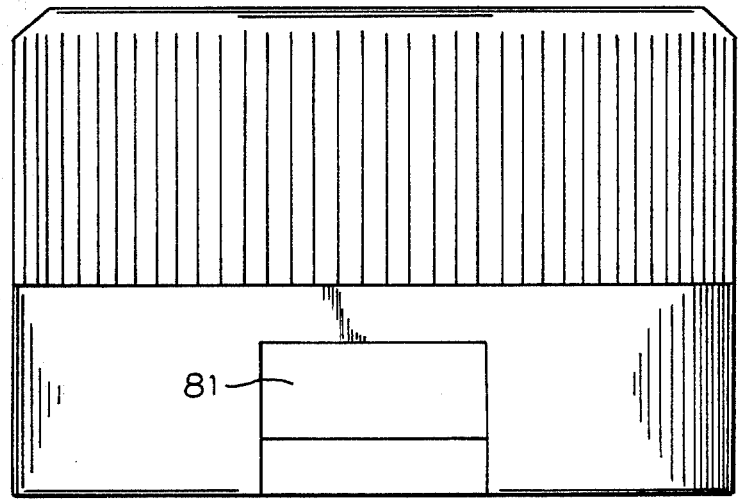
FIG. 25 is a side view of another form in which the flap-carrying skirt is an extension of the cap side wall.

In the form shown in FIGS. 19-24 the skirt is connected to the main body of the cap by connectors 62 which do not break during the unscrewing operation. Instead of such connectors there may be a thin membrane or there need be no distinct zone of separation between the main body and the skirt. Such a structure is shown in FIG. 25. To facilitate molding of the flap by conventional techniques a preferred form has an opening or window 81 which provides for a flap-molding cam insert. A vertical cross section (not shown) taken through window 81 of FIG. 25 is the same as that shown in FIG. 20 except that there is no separation between side wall and skirt and thus no separate links 62. A horizontal cross section (not shown) taken through the upper part of window 81 is the same as shown in FIG. 24, except that the links 62 are absent and the skirt-side wall portion which is, circumferentially, not at the windows (and flaps) is in cross section.

Figure 26:
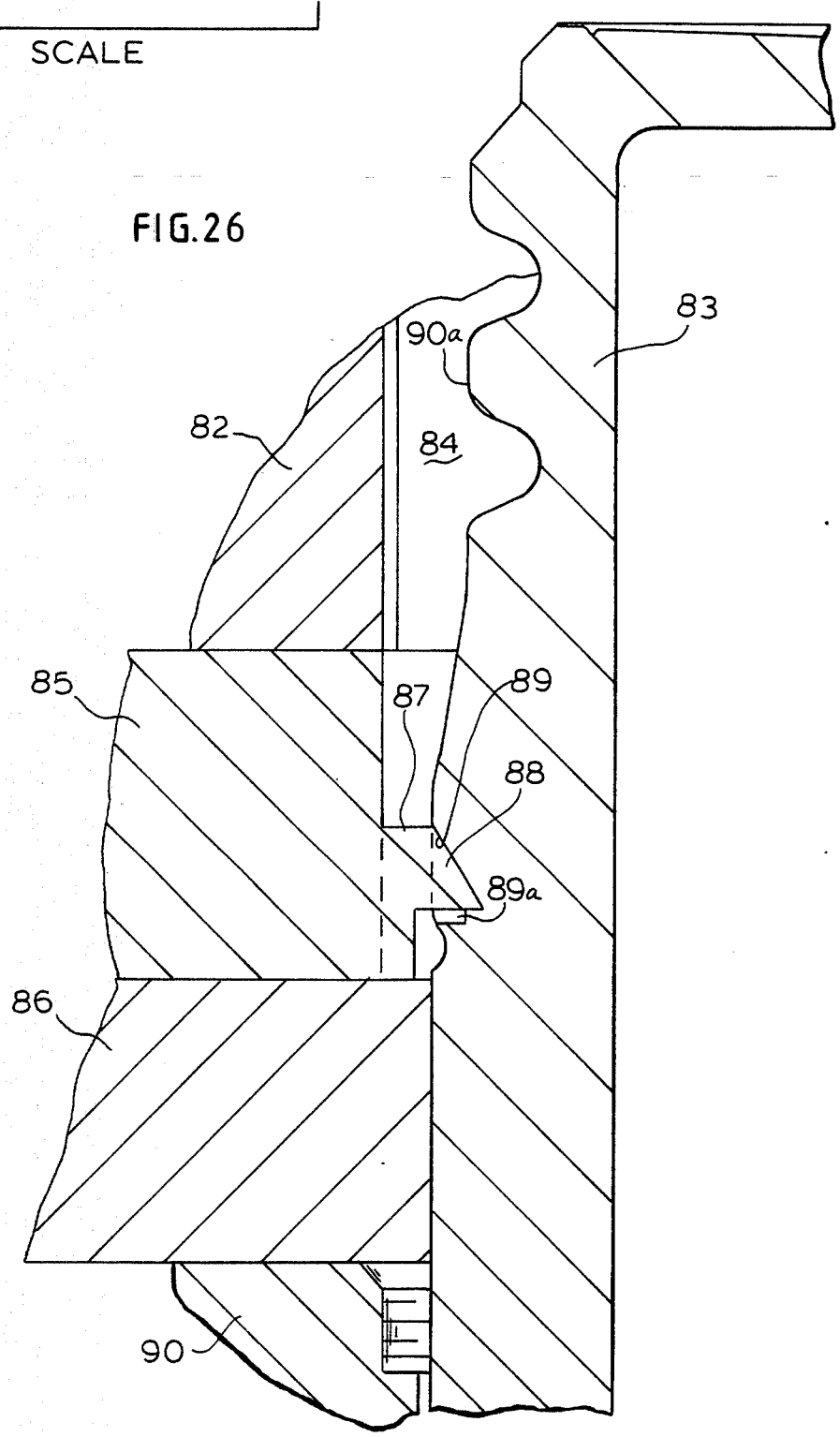
FIG. 26 is a cross-sectional side view of a portion of a mold.

The cap of FIG. 25 may be formed, for instance, in a mold of the type shown in FIG. 26, having a cavity 82, a core 83 which is located within the cavity while the plastic is being injectected into the mold space 84, and a pair of opposed cam inserts 85 (one of which is shown). Each cam insert is carried, respectively, by one of a pair of opposed cam slides 86. Each cam insert has a window-forming projection 87 whose angled end 88 fits into a correspondingly angled recess 89 in the core. Below the projection 87 the core is recessed at 89a to provide space for the material which will constitute the flap and also recessed to provide space to form the weakened zone of the cap skirt. After the plastic has been injected and cooled in the mold space each cam slide moves (with its insert 85) outwardly away from the core and then the core is withdrawn from the cavity 82 through the stripper ring 90 so that the formed cap is stripped from the core. During this stripping operation the movement of the threaded portion 90a of the core causes an elastic expansion of the threaded portion of the cap (as is conventional) and also causes the flap to be engaged and (with the skirt) pushed outwardly elastically by the angled wall of the core recess 89.

Generally the surfaces of the skirt (and the flap, when present) and of the shoulder, which contact each other, are such that the magnitude of the frictional drag engendered by unscrewing the cap is relatively low, so that the skirt may rotate substantially with the main body of the cap during the unscrewing operation.

In preferred forms of the invention each cap carries a circular gasket 91 (FIG. 1) retained against the inner face of the top wall 17. To help retain the gasket in the cap during transportation, etc., there are nubs 92 projecting inwards from the upper part of the side wall of the cap at a level just below (or at) the level of the bottom of the gasket.

The circular top wall of the cap has a fine projecting concentric ring 93 (FIG. 27) against which the gasket is pressed, and deformed, when the gasket is compressed (by contact with the lip 94 of bottle) when the cap is screwed onto the neck of the bottle. The cross section of this ring is preferably such that it has a relatively sharp bottom edge; most preferably it is V-shaped.

Figure 28:
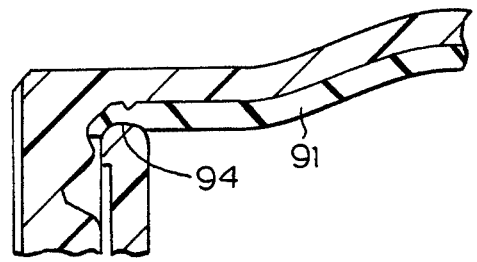
FIG. 28 is a cross-sectional side view showing the relationship of cap, gasket and bottle neck when the cap is screwed on tight.
Figure 2:
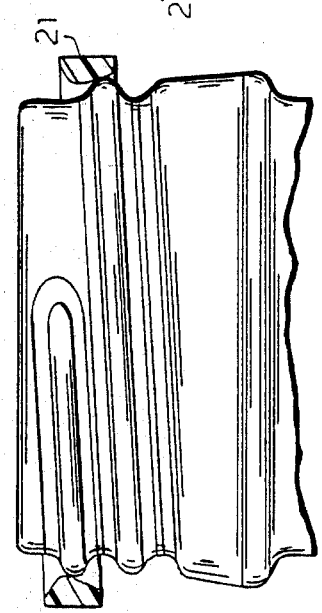
Figure 2A:
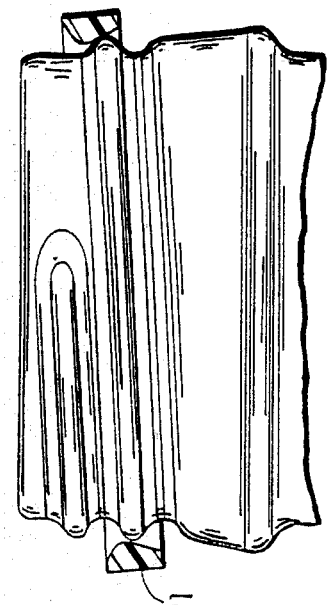
Figure 2B:
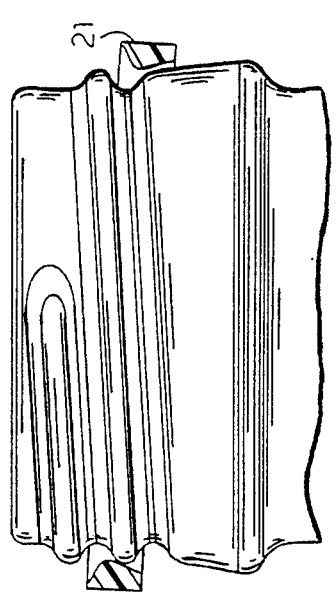
Figure 2C:
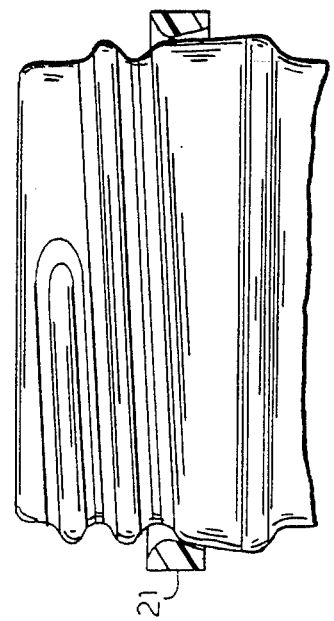
Figure 3:
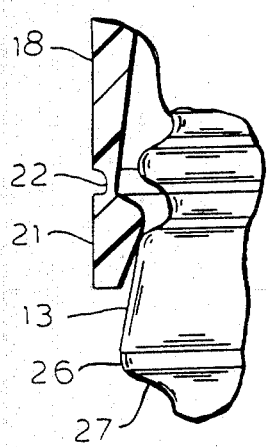
FIGS. 3 to 6 are side views of portions of the cap (in cross-section) and the neck showing successive positions as the cap is screwed onto the neck and the skirt snaps over a shoulder of the neck.

The inside corner 96 at which the top and side walls meet is integrally filled, e.g., chamfered as shown, to such an extent that the outer portion of the gasket becomes compressed and deformed against the outer edge of the bottle lip 94 when the cap is screwed on (see FIG. 28). The construction and stiffness of the cap are such that when, during storage or transportation, the pressure inside the bottle rises, the top wall of the cap is pushed upward and the corner is thereby correspondingly pulled inward. This puts additional pressure on the outer portion of the gasket, (situated between the chamfer at corner 96 and the outer edge of lip 94), making for a better seal (see FIG. 28) against loss of gas.

It should be noted that the capping of carbonated beverage bottles is conventionally carried out at low temperatures (e.g. 34°F.) for maximum solubility of $CO_2$. At that point the gas pressure in the bottle is relatively low (e.g. 10–15 psig or less). The pressure rises on warming. Typically capped bottles must pass a test requiring complete retention of $CO_2$ gas at 100 psig at 68° F.

Figure 27:
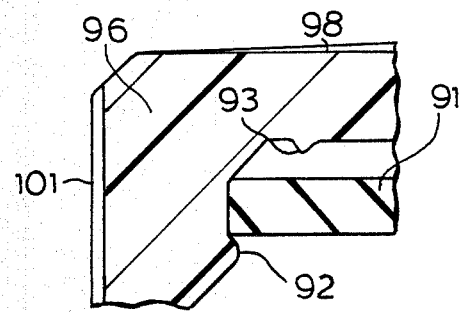
FIG. 27 is a cross-sectional side view of the gasket-holding portion of the cap.

Preferably the top wall of the cap is molded into a configuration which is concave upward as indicated at 98 (FIG. 27). Then when the cap is screwed on, the force exerted at lip 94 causes this originally concave wall to straighten (e.g. to a substantially flat configuration. Then the pressure resulting from release of gas (on warming, etc.) causes the cap to take on a domed shape, as indicated in FIG. 28.

The gasket retaining nubs 92 are preferably so situated that there is room above them for the outer circumferential portion of the gasket to be retained without substantially compression thereof against the chamfer; when the cap is screwed tightly onto the bottle that outer gasket portion is pushed upward and compressed against the chamfer at corner 96. Additional compression occurs when the gas pressure causes the corner to be pulled inward, as described above.

The structure and dimensions of the main body of the cap and its relationship to the gasket and the mouth of the bottle neck are shown in detail in my copending application Ser. No. 370,041 filed Apr. 20, 1982, whose entire disclosure is incorporated herein by reference. As indicated therein, a single cap may be suitable for the standard necks of both glass and plastic bottles despite the difference in the threads. Generally, the vertical travel of the cap during screwing-on (or unscrewing) is in the neighborhood of $\frac{1}{4}$ inch.

As is conventional, it is preferable that the side wall of the cap have a rough outer surface so that it may be easily gripped, for rotation, by the user. In the illustrated embodiments the side wall is serrated, as shown at 101 in FIG. 11, for instance.

It is understood that the foregoing detailed description is given merely by way of illustration and that variations may be made therein without departing from the spirit of the invention.

I claim:
1. A combination of a bottle and a molded plastic cap therefore,
   said bottle having a neck carrying an outwardly extending thread and having an outwardly extending shoulder beneath said thread,
   said cap comprising a top wall, an annular sidewall extending down from said top wall and having an inwardly extending thread for cooperation with said neck thread, and an integral antitamper skirt connected to said side wall,
   said skirt having at least a lower portion which, when the cap is fully screwed onto said neck, is at a level below said shoulder, said skirt having also an integral inwardly projecting flap which is integrally hinged thereto and which as molded projects inwardly, the construction and arrangement being such that
   (a) when, during the operation of screwing said cap onto said neck, said cap moves downward, said flap is engaged by said shoulder and pushed upward and outward thereby and then, on further downward movement of said cap during said operation, said flap is moved past said shoulder and
   (b) when, during the operation of unscrewing said cap from said neck, said cap moves upward, said flap engages the lower part of said shoulder and is forced by said engagement downward and outward into abutting relationship with said lower portion of said skirt so that the presence of said flap decreases the effective internal diameter of said lower portion of said skirt so as to prevent said skirt, while intact, from passing up over said shoulder.

2. A combination as in claim 1 in which, as a result of said decreased effective internal diameter of said skirt, said skirt is subjected to stretching stress by being forced upwardly against said shoulder when said cap is being unscrewed and said skirt has a zone of weakness which breaks when said skirt is subjected to said stretching stress.

3. A combination as in claim 1 in which there are frangible connectors connecting said side wall to said skirt, the construction being such that on said unscrewing said connectors break owing to said prevention of upward movement of said skirt, and said skirt is left on said neck.

4. A combination as in claim 1, said flap being molded as a thin flexible horizontally extending element having a lower face and an upper face, the construction and arrangement being such that during said screwing-on operation said lower face is engaged by said shoulder and during said unscrewing operation said upper face is pressed against said lower part of said shoulder thereby pressing said lower face against said lower portion of said skirt to decrease the effective internal diameter of said lower portion of said skirt so as to prevent said skirt, while intact, from passing up over said shoulder.

5. A combination as in claim 1 in which at least part of said lower portion of said skirt has an internal diameter which is less than said shoulder diameter.

6. A combination as in claim 5 in which at least part of said lower portion of said skirt has an internal diameter which is about 0.015 inch smaller than said shoulder diameter.

7. A combination as in claim 3 and comprising a one-way connection for transmitting the screwing-on force from said sidewall to said skirt and thus relieving the forces on said connectors when, during the screwing-on operation, said skirt is being forced over said shoulder.

8. A combination as in claim 1 in which the outer diameters of said skirt and said side wall are substantially equal.

9. A molded plastic cap for use with a bottle having a neck carrying an outwardly extending thread and having an outwardly extending shoulder beneath said thread, said cap comprising a top wall, an annular sidewall extending down from said top wall and having an inwardly extending thread for cooperation with said neck thread, and an integral antitamper skirt connected to said side wall, said skirt having at least a lower portion which, when the cap is fully screwed onto said neck, is at a level below said shoulder, said skirt having also an integral inwardly projecting flap which is integrally hinged thereto and which as molded projects inwardly, the construction and arrangement being such that (a) when during the operation of screwing said cap onto said neck, said cap moves downward, said flap is engaged by said shoulder and pushed outward thereby and then, on further downward movement of said cap during said operation, said flap is moved past said shoulder and (b) when, during the operation of unscrewing said cap from said neck, said cap moves upward, said flap engages the lower part of said shoulder and is forced by said engagement downward and outward into abutting relationship with said lower portion of said skirt so that the presence of said flap decreases the effective internal diameter of said lower portion of said skirt so as to prevent said skirt, while intact, from passing up over said shoulder.

10. A cap as in claim 9 in which, as a result of said decreased effective internal diameter of said skirt, said skirt is subjected to stretching stress by being forced upwardly against said shoulder when said cap is being unscrewed and said skirt has a zone of weakness which breaks when said skirt is subjected to said stretching stress.

11. A cap as in claim 9 in which there are frangible connectors connecting said side wall to said skirt.

12. A cap as in claim 10 in which said skirt is a strongly connected extension of said side wall.

13. A cap as in claim 9 in which said skirt has an inward bulge below said flap, the construction and arrangement being such that said upward movement of said cap causes said flap to be pressed, by said shoulder, against said bulge.

14. A plastic cap as in claim 11, the construction being such that on said unscrewing said connectors break owing to said prevention of upward movement of said skirt, and said skirt is left on said neck.

15. A cap as in claim 14 and comprising a one-way connection for transmitting the screwing-on force from said sidewall to said skirt and thus relieving the forces on said connectors when, during the screwing on operation, said skirt is being forced over said shoulder.

16. A cap as in claim 9 in which the outer diameters of said skirt and said side wall are substantially equal.

17. A molded cap as in claim 9, said flap being molded as a thin flexible inwardly extending element having a lower face and an upper face, the construction and arrangement being such that during said screwing-on operation said lower face is engaged by said shoulder and during said unscrewing operation said upper face is pressed against said lower part of said shoulder thereby pressing said lower face against said lower portion of said skirt to decrease the effective internal diameter of said lower portion of said skirt so as to prevent said skirt, while intact, from passing up over said shoulder.

* * * * *